United States Patent
Ozawa

(10) Patent No.: US 8,315,173 B2
(45) Date of Patent: Nov. 20, 2012

(54) TRANSMISSION APPARATUS AND METHOD FOR DISTRIBUTED MANAGEMENT THEREOF

(75) Inventor: Kimio Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 645 days.

(21) Appl. No.: 12/534,309

(22) Filed: Aug. 3, 2009

(65) Prior Publication Data

US 2010/0027990 A1    Feb. 4, 2010

(30) Foreign Application Priority Data

Aug. 1, 2008  (JP) ................................ 2008-199844

(51) Int. Cl.
*H04L 12/26*    (2006.01)

(52) U.S. Cl. ............ 370/242; 370/241; 710/48; 710/49; 710/260; 710/262

(58) Field of Classification Search ................ None
See application file for complete search history.

(56) References Cited

U.S. PATENT DOCUMENTS

| | | | | |
|---|---|---|---|---|
| 7,599,295 | B2* | 10/2009 | Dunbar et al. ................. | 370/235 |
| 2003/0037206 | A1* | 2/2003 | Benfield et al. ............... | 711/133 |
| 2004/0230712 | A1* | 11/2004 | Belmar et al. .................. | 710/15 |
| 2005/0268016 | A1* | 12/2005 | Mowry et al. ................. | 710/260 |
| 2007/0223917 | A1* | 9/2007 | Nagamine ........................ | 398/1 |
| 2010/0128611 | A1* | 5/2010 | Deguchi ........................ | 370/242 |
| 2011/0320662 | A1* | 12/2011 | Craddock et al. ............. | 710/263 |
| 2011/0320664 | A1* | 12/2011 | Belmar et al. ................ | 710/269 |

FOREIGN PATENT DOCUMENTS

| | | |
|---|---|---|
| JP | H03280731 | 12/1991 |
| JP | H082350082 | 9/1996 |
| JP | H11-177550 | 7/1999 |
| JP | 2007259316 A | 10/2007 |
| JP | 2008236527 A | 10/2008 |

OTHER PUBLICATIONS

Japanese Office Action for JP2008199844 mailed Jun. 19, 2012.

\* cited by examiner

*Primary Examiner* — Donald Mills

(57) ABSTRACT

Disclosed is a transmission apparatus in which a plurality of elements implement virtually one apparatus. Each element includes at least one main signal package and a monitor control package that is connected to the main signal package via an intra-apparatus bus 40 and connected to another monitor control package via an inter-apparatus communication bus. The monitor control package in one element, on occurrence of a malfunction in the main signal package being monitored, collects an alert from the main signal package being monitored, and transmits an alert masking control signal, using the inter-apparatus bus, to the monitor control package of another element to which belong the main signal package of a masking target. The main signal package of the masking target suppresses alerting of a second-order malfunction in case of detection of the second-order malfunction on receipt of the alert masking control signal.

12 Claims, 2 Drawing Sheets

TRANSMISSION APPARATUS AND METHOD FOR DISTRIBUTED MANAGEMENT THEREOF

REFERENCE TO RELATED APPLICATION

This application is based upon and claims the benefit of the priority of Japanese patent application No. 2008-199844 filed on Aug. 1, 2008, the disclosure of which is incorporated herein in its entirety by reference thereto.

FIELD OF THE INVENTION

This invention relates to a transmission apparatus and to method for distributed management thereof. More particularly, it relates to alert control.

BACKGROUND

In keeping up with a demand for high capacity and multi-functions of transmission apparatus, the number as well as sorts of main signal packages, managed by a management unit of the apparatus, is increasing. As the number as well as the sorts of targets of management increases, a higher performance is demanded of an apparatus management unit.

To perform processing within a prescribed time, the CPU is requested to operate at a higher speed. To handle the increased number and sorts of the targets of management, volatile memories, as working memories, or non-volatile memories, used for data storage, are requested to be of increased capacity.

It is not economically desirable to make designing in order to take account of the maximum capacity or implementation of the total of the functions of the transmission apparatus. It will be observed that request for high capacity and multi-functions of the transmission apparatus is contrary to the request for cost reduction of initial investment called for by a customer.

[Patent Document 1] JP Patent Kokai Publication No. JP-P2007-259316A

SUMMARY

The entire disclosure of above Patent Document is incorporated herein by reference thereto.

The following is an analysis by the present invention.

With the above-described transmission apparatus, the function of alert suppression is crucial. The present assignee has proposed suppression of alerting between main signal packages within one and the same apparatus in the prior application (JP Patent Application 2007-074942). The apparatus proposed in the prior application includes a monitor control package coupled to a main signal package via an intra-apparatus bus. The monitor control package collects alerting on a malfunction produced in the main signal package, using an intra-apparatus bus, and transmits a control signal that suppresses the alerting to other main signal packages affected by the malfunction, using the intra-apparatus bus.

The present inventor has conducted earnest researches and has invented a formulation in which, even in a virtual apparatus in which an aggregate of elements implement virtually a sole apparatus, it is possible to suppress the alerting to each one of elements disposed downstream to an element on detection of an alert.

It is an object of the present invention to provide a method and apparatus that allows for implementation of alert suppression even in a configuration which allows a plurality of apparatus to implement a virtual apparatus.

To solve one or more of the above problem, the invention disclosed in the present application may be summarized as follows:

In one aspect of the present invention, there is provided a transmission apparatus comprising a plurality of elements, each of which includes at least one main signal package and a monitor control package that monitors the main signal package and that is connected to a monitor control package of another element via an inter-apparatus bus. On occurrence of a malfunction in a main signal package in one element that the monitor control package monitors, the monitor control package in the one element collects an alert from the main signal package, and transmits, to the monitor control package of another element to which belong the main signal package of a masking target, an alert masking control signal, using the intra-apparatus bus. According to the present invention, when the monitor control package of the another element receives the control signal transmitted from the monitor control package in the one element via the inter-apparatus bus, it notifies an alert masking control signal to the main signal package of the masking target in the another element. When the main signal package of the masking target in the another element receives the control signal from the monitor control package of the another element, it suppresses an alert of a second-order malfunction on detection of the second-order malfunction.

The meritorious effects of the present invention are summarized as follows.

According to the present invention, alert suppression is made possible even in a case where a plurality of apparatus may be configured to implement a virtual apparatus.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTIONS OF THE DRAWINGS

PREFERRED MODES

Figure 1:
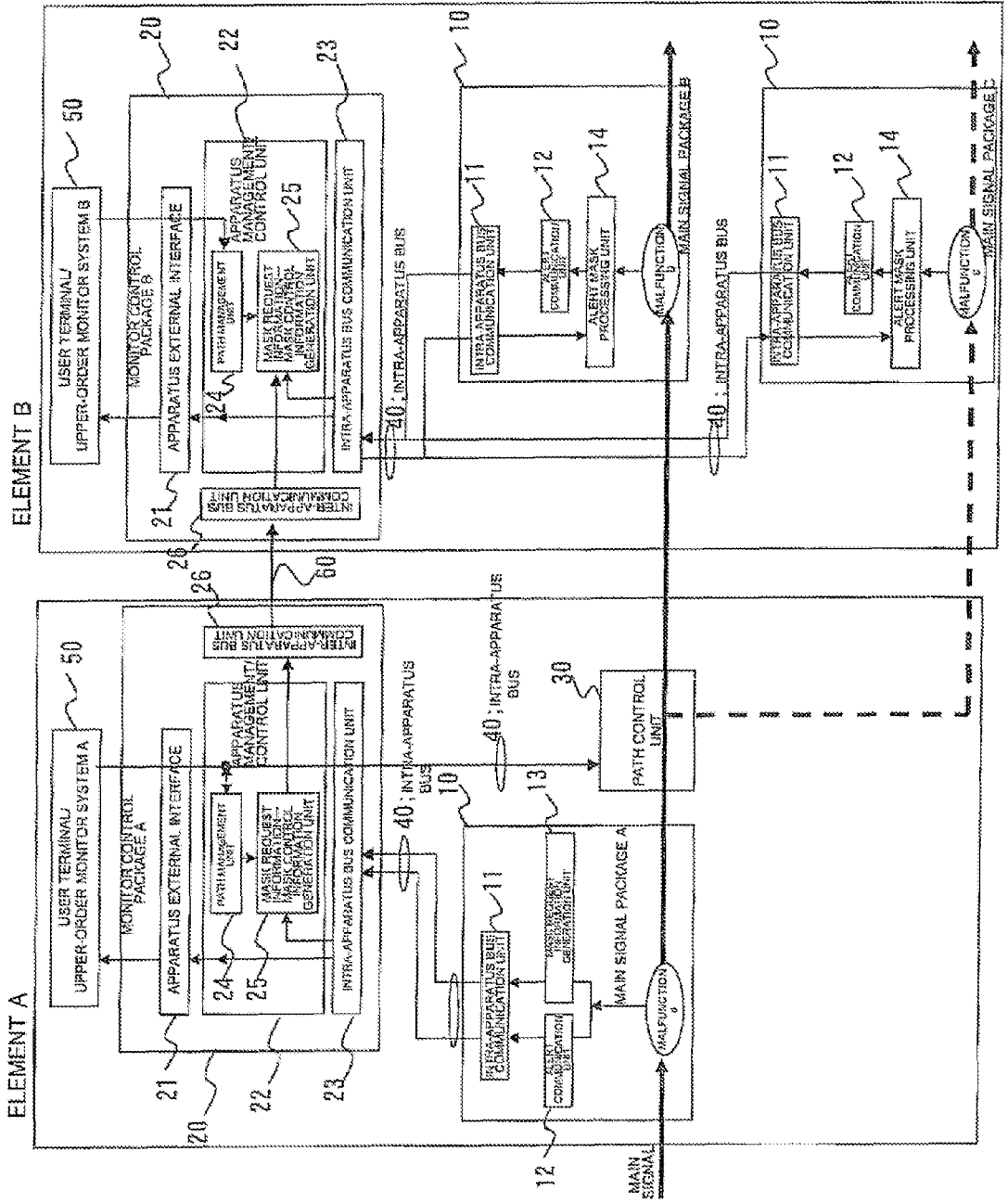
FIG. 1 is a block diagram showing a configuration of a first exemplary embodiment of the present invention.

With a transmission apparatus (basic transmission apparatus) according to the present invention, when a malfunction occur in a main signal package being monitored in an element, a monitor control package in the element collects an alert from the main signal package being monitored and using an inter-apparatus bus, transmits an alert masking control signal to a monitor control package of another element to which belongs the main signal package of the masking target. This suppresses second-order alerting in other elements. By making a plurality of apparatuses implement functionally one virtual apparatus, it is possible to decrease the number of the main signal packages as the target of management by the apparatus to enable doing without an apparatus management unit of excessively high performance. More specifically, in one aspect of the present invention, each of a plurality of elements includes at least one main signal package (10) and a monitor control package that is connected to the main signal package (10) via an intra-apparatus bus (40) and connected to another monitor control package (20) via an inter-apparatus communication bus (60). On occurrence of a malfunction in the main signal package (10) being monitored by the monitor control package (20) of an element A, an alert is collected from the main signal package being monitored. The monitor control package (20) of the element A transmits an alert masking control signal, using an inter-apparatus intra-apparatus bus (60), to the monitor control package (20) of the element B which is disposed downstream to the element A and to which belongs the main signal package of the masking target. The monitor control package (20) of the element B notifies an alert masking control signal to the main signal package of the element B of the masking target. The main signal package of the element B of the masking target, on receipt of the mask control information, suppresses alerting of a second-order malfunction in case of detection of the second-order malfunction in the main signal package (10) of the masking target.

Patent Document 1 discloses a configuration in which, when an agent apparatus (information processor) has detected a malfunction, it is confirmed whether or not setting has been made for non-notification of alarm for the malfunction. In case it has been confirmed that no setting for non-notification is made, alarm notification of the malfunction is transmitted to a manager apparatus (network manager apparatus). At the same time, an alarm mask setting request is transmitted to other agent apparatuses disposed on the downstream side on the signal flow to set non-notification of alarm for a malfunction that may arise in connection with the malfunction. The configuration disclosed in Patent Document 1 masks the second-order alerting in apparatus constituent components monitored by a manager apparatus. However, in Patent Document 1, there is never disclosed any configuration which performs second-order masking between apparatuses with regard to apparatuses controlled by one monitor control package and another monitor control package, respectively.

The present invention provides:

(1) an alert suppressing function of a basic transmission apparatus;
(2) an alert suppressing function of the basic transmission apparatus employing the path information; and
(3) an inter-apparatus alerting suppressing function of the basic transmission apparatus.

In the aforementioned prior application (JP Patent Application No. 2007-074942), there is shown a configuration in a basic transmission apparatus including a plurality of packages that transmit a main signal. The configuration shown is designed to prevent occurrence of an alert (second-order alert) different from a main cause alert (first-order alert), in addition to the main cause alert. This basic transmission apparatus includes a monitor control package that monitors a plurality of packages, each of which transmits a main signal. The monitor control package and the main signal package are connected by a communication bus (intra-apparatus bus) used for transmitting the information on setup, alerting and performance. In case an alert is produced in the main signal package, the monitor control package collects the alert and transmits an alert suppression signal to a package affected by the alert, using this communication bus to suppress second-order alerting.

In WDM (Wavelength Division Multiplexer) or ROADM (Reconfigurable Optical Add Drop Multiplexer) apparatus, light wavelength signals are transmitted as a main signal, such that there may not be provided an electrical interface between the respective signal packages. Even in such case, second-order alerting may be suppressed by exploiting the communication bus between the monitor control package and the main signal package without the necessity of providing a dedicated communication bus between the main signal packages.

The ROADM (Reconfigurable Optical Add Drop Multiplexer) apparatus has the function of selecting wavelength paths (Add, Drop, Through, Drop and Continue). If the path is changed, the connection state of the main signal packages in the apparatus is also changed, so that the site of occurrence of the second-order alert is also changed.

According to the present invention, the monitor control package recognizes a change in the connection state, and exercises control to suppress alerting for the package for which the second-order alerting should be suppressed, thus allowing for appropriate alerting suppression.

Recently, there is a demand for high capacity and multi-functions of a transmission apparatus. To meet this demand, a plurality of apparatuses may be configured to functionally implement a virtual apparatus. The individual apparatus, resulting from division, are termed elements and an aggregate of the elements is termed a virtual apparatus. The merit of this division is that the number of main signal packages in each element as the target of the management is reduced, while it becomes possible to do without an apparatus management unit of an unnecessary high performance.

According to the present invention, a communication bus is provided between the elements. This communication bus is exploited to detect a change in the alerting state between the elements and to exercise alerting suppression control to suppress the second-order alerting. The present invention will now be described with reference to exemplary embodiments.

EXEMPLARY EMBODIMENTS

FIG. 1 shows a configuration of an exemplary embodiment of the present invention. In FIG. 1, there is shown a configuration of an apparatus that implements an alert suppression function in the virtual apparatus. It is observed that, in FIG. 1, only two elements, namely an element A and an element B disposed downstream to the element A, are shown for simplicity of the drawing. The present invention is not limited to two elements and may, of course, be applied to three or more elements.

The elements A and B are each composed of a monitor control package 20, also termed a monitor controller, and a plurality of main signal packages 10 (main signal packages A to C). The monitor control package 20 monitors and controls the apparatus in its entirety. The monitor control package 20 is connected to the main signal packages 10 via an intra-apparatus bus 40.

In the exemplary embodiment of FIG. 1, the virtual apparatus includes the elements A and B. The monitor control package 20 of each element includes an apparatus external interface 21, and is connected to a user terminal or an upper-order monitor system. In FIG. 1, the user terminal and the upper-order monitor system are depicted as a user terminal/upper-order monitor system 50.

The apparatus external interface 21 receives an operation from the user and transmits it to an apparatus management/control unit 22.

The apparatus management/control unit 22 monitors and manages the apparatus in accordance with the operation from the user.

The monitor control package 20 includes an intra-apparatus bus communication unit 23 to carry out intra-apparatus communication with the main signal packages 10.

The apparatus management/control unit 22 includes a mask request information→mask control information generation unit 25 that holds the mask request information transmitted from the main signal packages 10 by intra-apparatus communication. A path management unit 24 of the apparatus management/control unit 22 manages the path information for a main signal. The mask request information→mask control information generation unit 25 of the apparatus management/control unit 22 decides on a package as an object of mask control, from the path information of the main signal of the path management unit 24, and accordingly generates the mask control information. The apparatus management/control unit 22 has the function of transmitting the mask control information, generated by the mask request information→mask control information generation unit 25, via the intra-apparatus bus communication unit 23 to the main signal packages 10.

The monitor control package 20 includes an inter-apparatus bus communication unit 26. The monitor control package 20 of the element A is connected to the monitor control package 20 of the element B via the inter-apparatus bus communication unit 26. The apparatus management/control units 22 of the monitor control packages 20 exchanges the information needed for alert suppression by intra-apparatus communication.

Each main signal package 10 is equipped with functions to process and monitor a main signal and to detect its malfunctions. Each main signal package 10 includes an intra-apparatus bus communication unit 11 and communicates with the monitor control package 20. Each main signal package 10 includes an alert communication unit 12 and a mask request information generation unit 13. When a malfunction occurs in a main signal, the alert communication unit 12 sends an alerting to the monitor control package 20. The mask request information generation unit 13 then generates the mask request information to suppress notification of a second-order malfunction and sends the generated mask request information to the monitor control package.

In the element B disposed downstream to the element A, each main signal package 10 includes an alert mask processing unit 14. On receipt of a mask control information (control signal that masks notification of the second-order malfunction) from the monitor control package 20 via the intra-apparatus bus 40 and the intra-apparatus bus communication unit 11, the alert mask processing unit 14 suppresses notification of the malfunctions detected by the own package to the monitor control package 20.

When a path control operation has been carried out, the path control unit 30 receives a control signal from the user terminal/upper-order monitor system 50 via the monitor control package 20. As a result, the path control unit changes over the path of the main signal.

Referring to FIG. 1, the function of notification of the first-order alert in case of occurrence of a malfunction in the main signal and suppression of notification of second-order alerting now will be described.

In case a malfunction a has occurred in the main signal package 10 of the element A, an alerting is detected by an alert detection function within the package, and a corresponding notification to the monitor control package 20 of the element A is performed. The main signal package 10 of the element A is referred to below as main signal package A, If, in the main signal package A, the malfunction a has occurred in the main signal, an alerting is detected by an alerting detection function within the main signal package A, and a corresponding notification to the monitor control package 20 of the element A is performed. The monitor control package 20 is also referred to as a monitor control package A. The main signal package A then transmits a notification for alerting, at the same time as it generates the mask request information as the information for suppressing the alert notification in other main signal packages that may be affected by the malfunction a. The main signal package then transmits the mask request information to the monitor control package A via the intra-apparatus bus 40.

In the monitor control package A, the path management unit 24, that manages the path information of the main signal, has already recognized that the main signal package A and the main signal package 10 of the element B, are currently in the connected state. The main signal package 10 of the element B is also referred to as a main signal package B.

The path of the main signal may be changed by an operation from the user terminal/upper-order monitor system 50. The path of the main signal may also be changed to the connection between the main signal package A and another main signal package 10 of the element B. This other main signal package of the element B is also termed a main signal package C.

In the following description, although there is no limitation imposed, it is assumed that the main signal package A and the main signal package B are in the connected relation. That is, the mask request information notified by the main signal package A, is to be transmitted to the main signal package B, with regard to the path connection relation.

If a malfunction has occurred in the main signal package A, there is a possibility that such malfunction affects the main signal package B disposed downstream to the main signal package A and there is also a possibility of notifying a secondary malfunction. To provide for facilitated identification of the cause of the malfunction, it is necessary to notify only a first-order factor and to suppress the alerting of a second-order factor (second-order alerting).

The monitor control package A is mounted on the element A, while the monitor control package B is mounted on the element B different from the element A. However, by communication via an inter-apparatus bus 60, the path information in the element A is transmitted to the element B, whereas the path information in the element B is transmitted to the element A. This allows for recognition of the connected relation between the main signal packages A and B. To provide for facilitated identification of the cause of the malfunction, it is necessary to notify the alerting as to only the first-order factor and to suppress alerting of the second-order factors.

Since the main signal packages A and B are in the connected relation, the monitor control package A generates the mask control information as the information to be transmitted to the main signal package B, from the mask request information received from the main signal package A.

The monitor control package A transmits the mask control information via the inter-apparatus bus 60 to the monitor control package B of the element B. The monitor control package A appends the sort of the first-order alert, information on the site of occurrence of the malfunction and so forth to the mask control information to transmit the resulting information to the monitor control package B of the element B.

The monitor control package B receives the mask control information, transmitted from the monitor control package A, via the inter-apparatus bus 60, and transmits the received mask control information to the main signal package B via the intra-apparatus bus 40.

The main signal package B detects a malfunction b as the second-order malfunction. However, since the monitor control package B has received the mask control information, transmitted from the monitor control package A, the alert mask processing unit 14 in the main signal package B suppresses the notification. As a result, no alerting is transmitted from the main signal package B to the monitor control package B.

In the present exemplary embodiment, the monitor control package A broadcasts the number of the element as the source of the mask request, such as the element "A", along with the mask control information in the monitor control package of the respective elements, as the broadcast destination. The monitor control package in each element of the broadcasting destination determines, based on the path information it owns, whether or not the mask control information received is to be processed. For example, if, in the main signal package 10 of the element A, there is a malfunction in a λ1 (wavelength number 1) signal, an occurrence of the λ1 malfunction in the element A is notified as the mask control information. In this case, it is determined from the path information that the element B has a connection from the element A to the element B with respect to the λ1 signal. If a malfunction that occurred in the λ1 signal has been detected in the main signal package in the element B, it is regarded to be a second-order malfunction. Hence, the element B proceeds to alert mask processing.

In the present exemplary embodiment, a common format may be used for the mask request information and the mask control information dealt with by the monitor control package, although this configuration is not intended to limit the present invention. For example, the manner of handling the upstream side malfunction and the downstream side malfunction and malfunctioning wavelength information (wavelength number) are used. The manner of handling the upstream side malfunction and the downstream side malfunction and malfunctioning wavelength information is e.g., the two-dimensional information showing the signal flow from a transponder as an input to an amplifier as an output, that is, the input/output correspondence relationship. By this configuration, it may be made unnecessary to deal with a situation in which the alerting of malfunction detection differs from package to package. That is, it may be made unnecessary to process the mask information of a large number of patterns to deal with respective different alerts of malfunction detection.

By the above operation, it is possible to implement appropriate alert suppression in a main transmission apparatus in a virtual apparatus in which selection of a main signal path is possible.

With the present exemplary embodiment, it is possible to suppress notification of malfunctions produced by second-order factors. Since this limits the alerting, notified to a user, to only the first-order factors, malfunction search may be facilitated so that time for restoration after malfunction may be reduced.

Since there is no necessity of providing a dedicated bus for alert suppression within an apparatus, the hardware configuration of the apparatus may be simplified to reduce costs.

With the present exemplary embodiment, since it is configured based on the general-purpose functional implementation, extension of the apparatus functions may be facilitated. With the present exemplary embodiment, in which an intra-apparatus bus, necessarily provided for a main signal package, is used, malfunction notification suppression means may be provided in a main signal package that may be added in future without the necessity of providing special functions.

Thus, with the present exemplary embodiment, notification of malfunction of the second-order factor is suppressed, for a case where a plurality of apparatuses are implemented functionally as a virtual apparatus. As a result, the management unit of the apparatus need not be endowed with excessively high performance, and hence it may become possible to reduce initial field investment costs.

Figure 2:
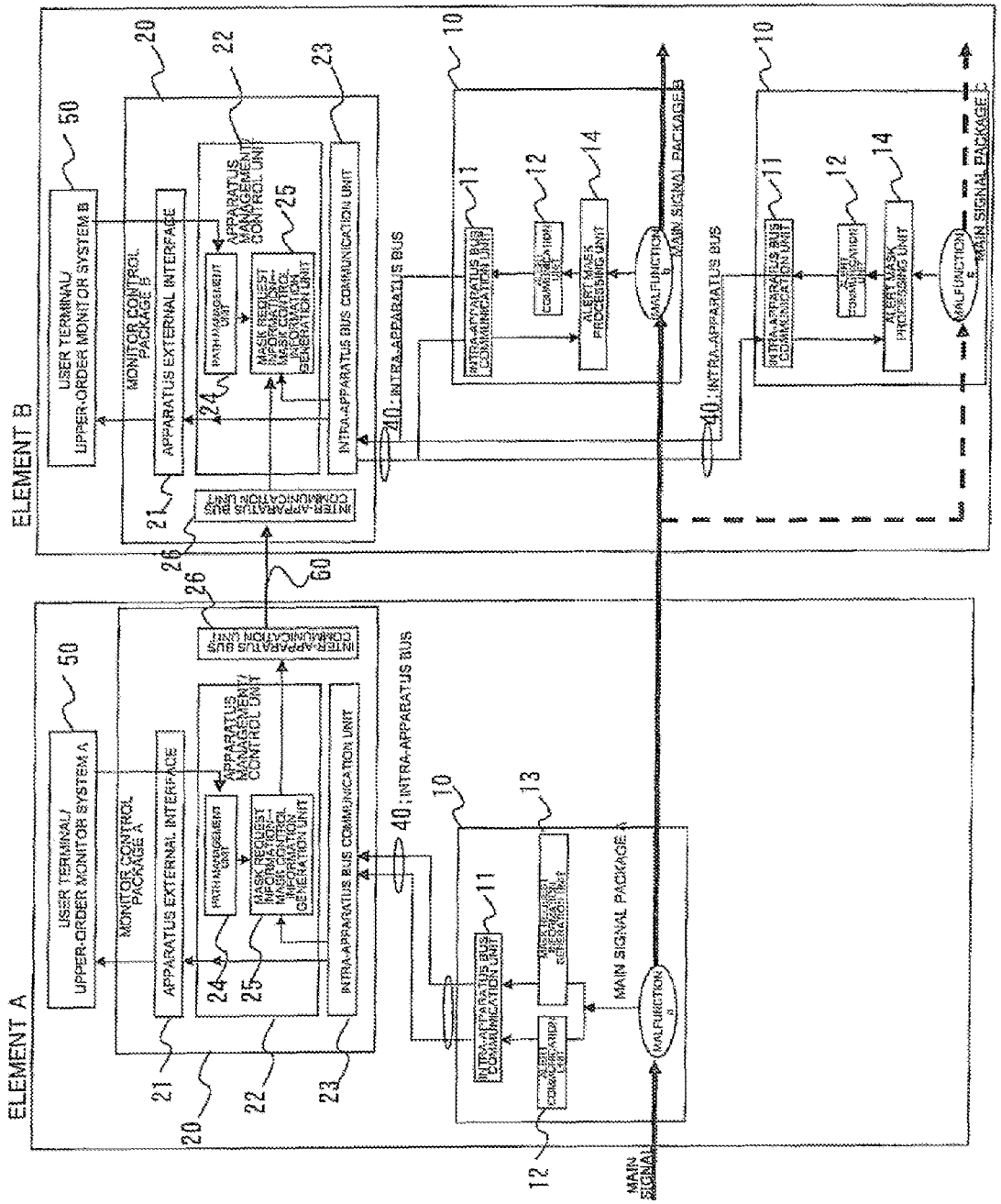
FIG. 2 is a block diagram showing a configuration of a second exemplary embodiment of the present invention.

Another exemplary embodiment of the present invention is now described. FIG. 2 shows the configuration of exemplary embodiment 2 of the present invention, in which alerting may be suppressed according to the present invention in an apparatus configuration not having the path control unit 30 of the first exemplary embodiment.

In FIG. 2, connection of an optical patch code is taken charge of by an engineer, responsible for construction, by way of performing path control. In the present exemplary embodiment, the path information is set from the user terminal/upper-order monitor system 50 in order for the apparatus management/control unit 22 to grasp the path information.

The path information is not used for path control of a main signal. However, it is used for the apparatus management/control unit to recognize the path for suppressing the alerting. This allows for suppressing the notification of the second-order alerting as in the configuration of FIG. 1.

The disclosures of the aforementioned Patent Documents are incorporated by reference herein. The particular exemplary embodiments or examples may be modified or adjusted within the gamut of the entire disclosure of the present invention, inclusive of claims, based on the fundamental technical concept of the invention. Further, variegated combinations or selections of the elements disclosed herein may be made within the framework of the claims. That is, the present invention may encompass various modifications or corrections that may occur to those skilled in the art within the gamut of the entire disclosure of the present invention, inclusive of claim and the technical concept of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A transmission apparatus comprising:
   a plurality of elements, each of the elements including:
   at least one main signal package; and
   a monitor control package that is provided in correspondence with the main signal package and that monitors the main signal package and that is connected to a monitor control package of at least one other element via an inter-apparatus bus, wherein
   the monitor control package in one element, on occurrence of a malfunction in the main signal package that the monitor control package monitors, collects an alert from the main signal package, and transmits an alert masking control signal, using the inter-apparatus bus, to the monitor control package of another element to which belong the main signal package of a masking target,
   wherein the monitor control package in the another element transmits path information in the another element to the monitor control package in the one element via the inter-apparatus to enable the monitor control package in the one element to recognize state of connection of the main signal package thereof with the main signal package of the another element, the monitor control package in the one element generating the alert masking control signal, based on the recognition of the state of the connection of the main signal package thereof with the main signal package of the another element.

2. The transmission apparatus according to claim 1, wherein the monitor control package in the another element, on receipt of the alert masking control signal transmitted by the monitor control package in the one element via the inter-apparatus bus, notifies an alert masking control signal to the main signal package of the masking target in the another element, and wherein
the main signal package of the masking target in the another element, on receipt of the control signal from the monitor control package in the another element, suppresses alerting a second-order malfunction, on detection of the second-order malfunction.

3. The transmission apparatus according to claim 1, wherein the alert masking control signal includes:
mask information of alert;
sorts of alert; and
information on a location of occurrence of a malfunction.

4. The transmission apparatus according to claim 1, wherein the monitor control package in the one element transmits path information in the one element to the monitor control package of the another element via the inter-apparatus bus so that the state of connection of the main signal package of the one element is recognizable on the side of the monitor control package of the another element.

5. The transmission apparatus according to claim 1, wherein the monitor control package of each element includes:
an interface connected to a user terminal/upper-order monitor system;
an apparatus management/control unit which includes: a path management unit that retains and manages path information of a main signal that is set from the user terminal/upper-order monitor system, and a unit that holds mask request information and that generates alert masking control information from the path information;
an intra-apparatus bus communication unit that communicates with the monitor control package via an intra-apparatus bus; and
an inter-apparatus bus communication unit that communicates with the monitor control package via the inter-apparatus bus.

6. The transmission apparatus according to claim 5, wherein a plurality of the elements virtually compose an apparatus,
on occurrence of a malfunction in the main signal package of the one element, the main signal package generates the mask request information for alert suppression, and
the main signal package then transmits the mask request information to the monitor control package of the one element via the intra-apparatus bus, wherein
in the monitor control package of the one element,
the intra-apparatus bus communication unit receives the mask request information transmitted from the main signal package via the intra-apparatus bus, and notifies the apparatus management/control unit of the mask control information,
the apparatus management/control unit decides the main signal package of the masking target from the path information of the main signal, and generates the mask control information that suppresses alert notification to the monitor control package of the another element to which belong the main signal package of the masking target, and
the inter-apparatus bus communication unit transmits the mask control information via the inter-apparatus bus to the monitor control package of the another element, and wherein
in the monitor control package of the another element,
the inter-apparatus bus communication unit on receipt of the mask control information via the inter-apparatus bus notifying the main signal package of the another element of the mask control information via the intra-apparatus bus of the another element, and
the main signal package of the another element on receipt of the alert masking control signal suppresses the alerting of a second-order malfunction, in case of detection of the second-order malfunction.

7. The transmission apparatus according to claim 1, further comprising
a path control unit that is connected to the monitor control package via an intra-apparatus bus and that controls the switching of a path for a main signal.

8. A method for distributed management of a transmission apparatus, that comprises:
a plurality of elements, each of the elements including:
at least one main signal package; and
a monitor control package that is provided in correspondence with the main signal package that monitors the main signal package and that is connected to a monitor control package of at least one other element via an inter-apparatus bus; the method comprising:
collecting, by the monitor control package in one element, an alert from the main signal package in the one element that the monitor control package monitors, on occurrence of a malfunction in the main signal package;
transmitting, by the monitor control package in the one element, an alert masking control signal, using the inter-apparatus bus, to the monitor control package in another element to which belong the main signal package of a masking target;
the monitor control package in the another element transmitting path information in the another element to the monitor control package in the one element via the inter-apparatus to enable the monitor control package in the one element to recognize state of connection of the main signal package thereof with the main signal package of the another element; and
the monitor control package in the one element generating the alert masking control signal, based on the recognition the state of the connection of the main signal package thereof with the main signal package of the another element.

9. The method according to claim 8, comprising:
transmitting, by the monitor control package of the another element, an alert masking control signal to the main signal package of the masking target in the another element; and
on receipt of the alert masking control information, suppressing, by the main signal package of the masking target, the alerting of the second-order malfunction in case of detection thereof.

10. The method according to claim 8, wherein the alert masking control signal includes:
mask information of alert;
sorts of alert; and
information on a location of occurrence of a malfunction.

11. A monitor control package apparatus connected to a main signal package via an intra-apparatus bus, comprising:
- an inter-apparatus bus communication unit that communicates with at least one other monitor control package apparatus via an inter-apparatus bus;
- a unit that receives, via the intra-apparatus bus, mask request information for alert suppression generated in the main signal package on occurrence of a malfunction in the main signal package;
- a unit that determines a main signal package of a masking target and that generates a mask control signal for suppressing alert notification to the monitor control package; and
- a unit that transmits the mask control information via the inter-apparatus bus to another monitor control package that monitors the main signal package of the masking target.

12. The monitor control package apparatus according to claim 11, further comprising:
- an interface connected to a user terminal/upper-order monitor system;
- an apparatus management/control unit including a path management unit that stores and manages the path information of a main signal set from the user terminal/upper-order monitor system, and a means that holds the mask request information and that generates, from the path information, the mask control information for masking an alert; and
- an intra-apparatus bus communication unit that communicates with the monitor control package via an intra-app bus.

* * * * *